United States Patent [19]

Pirsch

[11] Patent Number: 4,748,503
[45] Date of Patent: May 31, 1988

[54] DATA REDUCTION CIRCUIT WITH A DIFFERENTIAL PULSE CODE MODULATOR FOR VIDEO SIGNALS

[75] Inventor: Peter Pirsch, Ludwigsburg, Fed. Rep. of Germany

[73] Assignee: Deutsche ITT Industries GmbH, Freiburg, Fed. Rep. of Germany

[21] Appl. No.: 37,379

[22] Filed: Apr. 13, 1987

[30] Foreign Application Priority Data

Apr. 19, 1986 [EP] European Pat. Off. ........ 86105444.3

[51] Int. Cl.$^4$ .............................................. H04N 7/12
[52] U.S. Cl. ...................................... 358/135; 375/27; 375/30
[58] Field of Search ...................... 358/135, 136, 133; 375/27, 30; 382/56; 240/347 AD

[56] References Cited

U.S. PATENT DOCUMENTS

| | | | |
|---|---|---|---|
| 4,255,763 | 3/1981 | Maxemchuk et al. | 358/135 |
| 4,375,013 | 2/1983 | Cointot et al. | 375/27 |
| 4,460,923 | 7/1984 | Hirano et al. | 358/136 |
| 4,541,102 | 9/1985 | Grallert | 375/30 |
| 4,562,468 | 12/1985 | Koga | 375/27 |
| 4,706,260 | 11/1987 | Fedele et al. | 358/133 |

*Primary Examiner*—James J. Groody
*Assistant Examiner*—John K. Peng
*Attorney, Agent, or Firm*—T. L. Peterson

[57] ABSTRACT

A data reduction circuit employs a differential pulse code modulator for input video signals where the time-critical loop includes a loop subtractor (s2), a quantizer (q), and a loop delay element (v3), so that differential pulse code modulation can be performed at higher clock rates than with conventional architectures. With 2 $\mu$m CMOS or N-channel MOS technology, for example, clock rates of 17 to 20 MHz are possible. The circuit includes a limiter circuit which applies the input video signals to the loop subtractor minuend input after processing the same. The output of the delay element in the loop is applied to inputs of a first adder, a vertical predictor and a constant multiplier, the multiplier receive a weighting factor equal to the square of a given weighting factor with the output of the multiplier applied to the subtrahend input of a first subtractor whose output is coupled to the input of the loop subtractor via a delay element. The output of the vertical predictor is applied respectively to the inputs of another constant multiplier, another delay element and to the subtrahend input of another subtractor. The outputs of these units are applied to enable input video signals as processed to be applied to the minuend input of the first subtractor to thereby reduce the circuitry needed in the time critical loop.

5 Claims, 1 Drawing Sheet

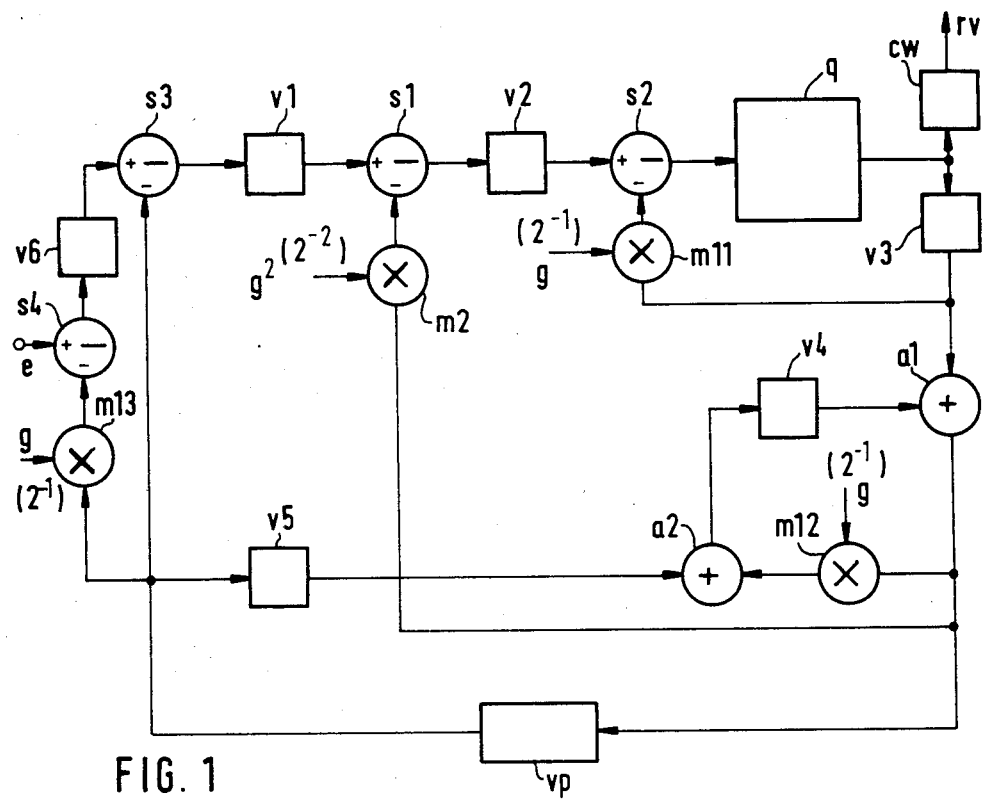
FIG. 1
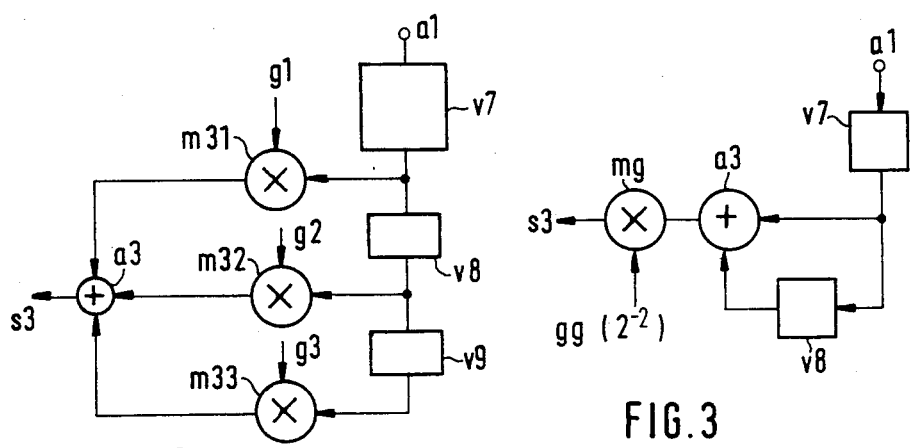
FIG. 2
FIG. 3

DATA REDUCTION CIRCUIT WITH A DIFFERENTIAL PULSE CODE MODULATOR FOR VIDEO SIGNALS

BACKGROUND OF THE INVENTION

The present invention relates in general to a data reduction circuit for reducing the number of bits of input data digital video signals, and more particularly to a data reduction circuit employing a differential pulse code modulator (DCPM) wherein a time critical loop of said modulator is modified for faster clock operation.

A data reduction circuit of this kind was described by the inventor in an article published in "Proc. IEEE", Vol. 73, No. 4, April 1984, pp. 592 to 598 and which article is incorporated herein by reference. According to that article, the prior art arrangement permits a clock rate of about 10 MHz and can be implemented with a single integrated circuit if 2-/um CMOS technology is used. The maximum possible clock rate of about 10 MHz is too low if such data reduction circuits are to be used in circuits for eliminating flicker in a television picture. This requires higher clock rates which range from about 17 MHz to 20 MHz.

In the prior art arrangement, the time-critical loop, which limits the maximum clock rate, contains a subtractor, an adder, a limiter, a delay element, and a quantizer. This loop must perform the necessary computations within one period of the clock signal, which is only about 100 ns in the prior art arrangement if correspondingly fast adder/subtractor stages are used.

Accordingly, the problem to be solved by the invention is to improve the data reduction circuit so that a shorter computation time corresponding to the intended clock rate of about 17 to 20 MHz is achieved. While the overall circuit is more complicated than the prior art arrangement and contains more subcircuits than the prior art circuit it exhibits improved operation. The advantage, which lies in the solution of the problem, namely, a processing speed about twice that of the prior art arrangement, is achieved, inter alia, by eliminating the need for the adder and limiter in the time-critical loop, so that the latter consists only of the quantizer and subtractor and a delay element. The limiter is placed ahead of the input of the data reduction circuit.

The limiter at the input is designed to reduce the number of bits of the input data as a function of the quantizer characteristic in such a way that during the reconstruction of the sample values within the DPCM loop, a given number of bits, e.g., 8 bits, is not exceeded.

The above-mentioned configuration of the time-critical loop is also the subject matter of European Application No. 85 10 4051.9 corresponding to U.S. Pat. No. 4,713,828. When testing this arrangement, it was discovered that the rounding effects occurring in the two recursive loops with the constant multiplier for $2^{-1}$, which are due to the limitation of the number of bits of the signals, adversely affect the behavior of the data reduction circuit in the presence of input signals showing little variation with time. This results in an increase of the so-called "granular-noise effect". In addition, this impairs the reduction of transmission errors in the receiver.

The present invention provides an arrangement which, using the same configuration of the time-critical loop as in the prior European application, reduces these rounding effects to a tolerable measure. Besides the time-critical loop, there are only signal paths in which two adders or one adder and one subtractor are required between two successive delay elements, which is not the case in the prior arrangement.

Further advantages will become apparent from the following description of the invention taken in conjunction with the accompanying Figures.

BRIEF DESCRIPTION OF THE PREFERRED EMBODIMENT

A data reduction circuit of the type used for reducing the number of bits of input data digital video signals by employing a differential pulse code modulator, said modulator having a first delay element having an input adapted to receive said input data, and with said delay changing at the rate of a clock signal, with the output of said first delay element connected to the minuend input of a first subtractor, with the output of the first subtractor connected to the input of a second delay element having an output connected to the minuend input of a second subtractor with the output of the second subtractor connected to the input of a quantizer with the output of the quantizer coupled to the input of a third delay element whose output is coupled to one input of a first adder and to the input of a first constant multiplier multiplying by a first weighting factor with the multiplier output coupled to the subtrahend input of said second subtractor with the output of said first adder connected to the input of a vertical predictor circuit with the delay of each of said first, second and third delay elements being equal to the period of said clock signal, the improvement in combination therewith of apparatus for providing a limiter for said input digital signals prior to application of said signals to said first delay element comprising a second constant multiplier circuit a weighting factor equal to the square of the first weighting factor and having the input coupled to the output of said first adder and having the output coupled to the subtrahend input of said first subtractor with the output of said first adder further connected to the first input of a third constant multiplier circuit for receiving at the second input said first weighting factor and having an output coupled to the input of a second adder having an output coupled to an input of a fourth delay element with the output of said fourth delay element coupled to the other input of said first adder, with the output of said vertical predictor connected to an input of a fifth delay element having an output coupled to the other input of said second adder, with the output of said vertical predictor further connected to the subtrahend input of a third subtractor and to the first input of a fourth constant multiplier circuit for receiving at the second input said first weighting factor with the output of said fourth multiplier coupled to the subtrahend input of a fourth subtractor having the minuend input adapted to receive said input data digital signal, with the output of said fourth subtractor coupled to the input of a sixth delay element having an output coupled to the minuend input of said third subtractor with the output of said third subtractor coupled to the input of said first delay element, with the delay of said fifth delay element equal to twice the clock period and that of said sixth delay element equal to one clock period.

BRIEF DESCRIPTION OF THE FIGURES

FIG. 1 is a block diagram of an embodiment of the invention.

FIG. 2 is a block diagram of an embodiment of a subcircuit of FIG. 1.

FIG. 3 is a block diagram of a preferred embodiment of the subcircuit of FIG. 2.

DETAILED DESCRIPTION OF THE FIGURES

The block diagram of FIG. 1, which shows an embodiment of the invention, contains the input e for the input data, i.e., for digital video signals, whose number of bits is to be reduced from e.g., 8 to 4. In the prior art arrangement, the input data is fed to the first delay element v1, whose output is coupled to the minuend input of the first subtractor s1. From the output of the latter, they pass through the second delay element v2 and are applied to the minuend input of the second subtractor s2.

The output of the second subtractor s2 is coupled to the input of the quantizer q, which may be of a design as described in the prior art, i.e., which is preferably a read only memory with a look-up table for 16 representative levels. Its output is connected through the code converter cw to the output for the data-reduced output signal rv and, on the other hand, directly to the input of the third delay element v3. The output of the third delay element v3 is also connected to the subtrahend input of the second subtractor s2 through the first constant multiplier m11 multiplying by the first weighting factor g.

The output of the first adder a1 is coupled through the second constant multiplier m2 multiplying by the second weighting factor $g^2$, which is equal to the square of the first weighting factor g, to the subtrahend input of the first subtractor s1. In addition, it is connected to the second input of the first adder a1 via the third constant multiplier m12 multipying by the weighting factor g, one of the input-output paths of the second adder a2, and the fourth delay element v4, and to the input of the vertical predictor vp.

The output of the latter is connected to the third subtractor s3 ahead of the first delay element v1; in addition, it is coupled through the fifth delay element v5 to the other input of the second adder a2 and through the fourth constant multiplier m13 multiplying by the first weighting factor g to the subtrahend input of the fourth subtractor s4, whose minuend input is the input e for the input signals and whose output is coupled through the sixth delay element v6 to the minuend input of the third subtractor s3.

The delay provided by each of the first to the fourth delay elements v1 . . . v4 and the sixth delay element v6 is equal to the period of the clock signal, while that of the fifth delay element v5 is twice as long.

FIG. 2 shows an embodiment of the vertical predictor vp of FIG. 1. On the input side, it contains the seventh delay element v7, whose delay is four clock periods shorter than the multiple of this period which is equal to the number of picture elements per video line. The seventh delay element v7 is followed by the series combination of the eight and ninth delay elements v8 and v9, each of which produces a delay equal to one clock period. The input, the center tap, and the output of this series combination are each connected to one of the three inputs of the third adder a3 via the additional constant multiplier m31, m32, and m33 for further weighting factors g1, g2, and g3, respectively. The output of the third adder a3 is that of the vertical predictor vp.

FIG. 3 shows a simplified embodiment of the arrangement of FIG. 2. The ninth delay element v9 and the subsequent additonal constant multiplier m33 are no longer present. The two other additional constant multipliers m31, m32 have been combined into one constant multiplier mg for the common weighting factor gg, which follows the output of the third adder a3. The delay produced by the seventh delay element v7 is four clock periods shorter than the multiple of this period which is equal to the number of picture elements per video line.

It is also possible to use a field or frame store for the seventh delay element v7.

The weighting factors g and $g^2$ in the embodiment of FIG. 1 preferably have the values ½ and ¼, respectively, and the weighting factor gg in the embodiment of FIG. 3 preferably has the value ¼, as shown in those figures by the powers of two given in parentheses.

While the signal-carrying lines between the individual subcircuits are shown in the figures of the accompanying drawing as simple interconnecting leads, the latter symbolize busses, because the individual subcircuits process data words in parallel, which follows from the above-mentioned operating speed of the data reduction circuit in accordance with the invention. The term "parallel signal processing" as used here includes parallel signal processing by the so-called pipeline technique, in which the individual bits of a digital word within the clock system formed by the clock signal are processed with a delay of at least one clock period relative to the other bits.

The circuit in accordance with the invention is suited for implementation not only in the above-mentioned CMOS technology but also in any other semiconductor technology, such as N-channel MOS technology.

What is claimed is:

1. A data reduction circuit of the type used for reducing the number of bits of input data digital video signals (e) by employing a differential pulse code modulator, said modulator having a first delay element (v1) having an input adapted to receive said input data (e), and with said delay changing at the rate of a clock signal, with the output of said first delay element connected to the minuend input of a first subtractor (s1), with the output of the first subtractor (s1) connected to the input of a second delay element (v2) having an output connected to the minuend input of a second subtractor (s2) with the output of the second subtractor connected to the input of a quantizer (q) with the output of the quantizer coupled to the input of a third delay element (v3) whose output is coupled to one input of a first adder (a1) and to the input of a first constant multiplier (m11) multiplying by a first weighting factor (g) with the multiplier output coupled to the subtrahend input of said second subtractor (s2) with the output of said first adder connected to the input of a vertical predictor circuit (vp) with the delay of each of said first, second and third delay elements (v1, v2, v3) being equal to the period of said clock signal, the improvement in combination therewith of apparatus for providing a limiter for said input digital signals prior to application of said signals to said first delay element (v1) comprising:

a second constant multiplier circuit (m2) multiplying by a weighting factor equal to the square of the first weighting factor and having the input coupled to the output of said first adder (a1) and having the output coupled to the subtrahend input of said first subtractor (s1), with the output of said first adder (a1) further connected to the first input of a third constant multiplier circuit (m12) for receiving at the second input said first weighting factor (g) and having an output coupled to the input of a second adder (a2) having an output coupled to an input of a fourth delay element (v4) with the output of said fourth delay element coupled to the other input of said first adder (a1), with the output of said vertical predictor (vp) connected to an input of a fifth delay element (v5) having an output coupled to the other input of said second adder (a2), with the output of said vertical predictor (vp) further connected to the subtrahend input of a third subtractor (s3) and to the first input of a fourth constant multiplier circuit (m13) for receiving at the second input said first weighting factor (g) with the output of said fourth multiplier (m13) coupled to the subtrahend input of a fourth subtractor (s4) having the minuend input adapted to receive said input data digital signal (e), with the output of said fourth subtractor coupled to the input of a sixth delay element (v6) having an output coupled to the minuend input of said third subtractor (s3) with the output of said third subtractor coupled to the input of said first delay element (v1), with the delay of said fifth delay element (v5) equal to twice the clock period and that of said sixth delay element (v6) equal to one clock period.

2. The data reduction circuit according to claim 1, wherein said weighting factors are powers of two with negative exponents.

3. The data reduction circuit according to claim 2, wherein said first weighting factor (g) is $2^{-1}$.

4. The data reduction circuit according to claim 1, wherein said vertical predictor (vp), includes:
  a seventh delay element (v7) whose delay is four clock periods shorter than the multiple of this period which is equal to the number of picture elements per video line;
  the output of the seventh delay element (v7) is coupled to the series combination of an eighth delay element (v8) and a ninth delay element (v9), each providing a delay equal to one clock period, and
  the input, the center tap, and the output of said series combination are each connected via an additional constant multiplier (m31, m32, m33) multiplying by a further weighting factor (g1, g2, g3) to one of the inputs of a third adder (a3), whose output is that of the vertical predictor (vp) and is connected to the input of said fifth delay element (v5), to the input of said fourth multiplier (m13) and to the subtrahend input of said third subtractor (s3).

5. A data reduction circuit according to claim 1, wherein said vertical predictor includes:
  a seventh delay element having an input coupled to the output of said first adder and having a delay being four clock periods shorter than the multiple of this period which is equal to the number of picture elements per video line;
  the output of said seventh delay element (v7) connected to the input of an eighth delay element (v8) having its output coupled to an input of a third adder (a3), with the other input of said third adder connected to the output of said seventh delay element (v7) with the output of said third adder connected to the input of an additional constant multiplier (mg) for receiving at another input another weighting factor (gg) with the output of said multiplier connected to the input of said fifth delay element, to the input of said fourth multiplier (m13) and to the subtrahend input of said third subtractor (s3).

* * * * *